(12) United States Patent
Hase et al.

(10) Patent No.: US 11,556,030 B2
(45) Date of Patent: Jan. 17, 2023

(54) LIQUID CRYSTAL DISPLAY DEVICE

(71) Applicant: Japan Display Inc., Tokyo (JP)

(72) Inventors: Kasumi Hase, Tokyo (JP); Koichi Igeta, Tokyo (JP); Shinichi Komura, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/703,981

(22) Filed: Mar. 25, 2022

(65) Prior Publication Data

US 2022/0308395 A1 Sep. 29, 2022

(30) Foreign Application Priority Data

Mar. 29, 2021 (JP) .............................. JP2021-055561

(51) Int. Cl.
| | | |
|---|---|---|
| *G02F 1/1335* | (2006.01) | |
| *G02F 1/1347* | (2006.01) | |
| *G02F 1/1343* | (2006.01) | |
| *G02F 1/1368* | (2006.01) | |
| *G02F 1/13363* | (2006.01) | |

(52) U.S. Cl.
CPC ...... *G02F 1/133553* (2013.01); *G02F 1/1347* (2013.01); *G02F 1/1368* (2013.01); *G02F 1/13439* (2013.01); *G02F 1/133528* (2013.01); *G02F 1/134336* (2013.01); *G02F 1/13363* (2013.01); *G02F 2201/343* (2013.01)

(58) Field of Classification Search
CPC ......... G02F 1/133553; G02F 1/133528; G02F 1/134336; G02F 1/13439; G02F 1/1347; G02F 1/1368; G02F 1/13363; G02F 2201/343
See application file for complete search history.

(56) References Cited

U.S. PATENT DOCUMENTS

| | | | |
|---|---|---|---|
| 2017/0261667 A1 | 9/2017 | Anzai et al. | |
| 2018/0136518 A1* | 5/2018 | Min | G02F 1/133528 |
| 2019/0187356 A1 | 6/2019 | Hirabayashi | |
| 2022/0050240 A1* | 2/2022 | Cho | G02F 1/133615 |

FOREIGN PATENT DOCUMENTS

| | | |
|---|---|---|
| JP | 2019-109429 A | 7/2019 |
| WO | 2016/088707 A1 | 6/2016 |

* cited by examiner

*Primary Examiner* — Edward J Glick
*Assistant Examiner* — David Y Chung
(74) *Attorney, Agent, or Firm* — Xsensus LLP

(57) ABSTRACT

According to one embodiment, a liquid crystal display device includes a first liquid crystal device, a second liquid crystal device, and a liquid crystal display panel, the first liquid crystal device including a first substrate including a first electrode thereon, a second substrate including a second electrode thereon, and a first cholesteric liquid crystal layer, the second liquid crystal device including a third substrate including a third electrode thereon, a fourth substrate including a fourth electrode thereon, and a second cholesteric liquid crystal layer, wherein the first liquid crystal device and the second liquid crystal device are stacked successively.

4 Claims, 12 Drawing Sheets

LIQUID CRYSTAL DISPLAY DEVICE

CROSS-REFERENCE TO RELATED APPLICATIONS

This application is based upon and claims the benefit of priority from Japanese Patent Application No. 2021-055561, filed Mar. 29, 2021, the entire contents of which are incorporated herein by reference.

FIELD

Embodiments described herein relate generally to a liquid crystal display device.

BACKGROUND

Liquid crystal display devices have been widely used as display devices for smartphones, tablet computers, car navigation systems, and the like. In general, a liquid crystal display device comprises a liquid crystal display panel and an illumination device (backlight or front light) disposed to overlap a back surface or a front surface of the liquid crystal panel. The illumination device includes a light guide, a light source for emitting light to be made incident on the light guide, and the like. For example, white light emitting diodes (LED) are often used as the light source.

The light emitted from the white LED contains light having a wavelength range of 380 to 500 nm, which is referred to as blue light. The blue light has properties closest to the ultraviolet light, including a property of reaching retina without being absorbed into cornea or lens of an eye. For this reason, concerns on health such as adverse effects on eyes and sleep disorders upon viewing the blue light for a long time have been focused. Therefore, a display device provided by overlapping a resin layer (blue light blocking layer) to reduce such blue light on a display surface or back surface of the liquid crystal panel has been proposed.

In contrast, development of an optical element using cholesteric liquid crystal as an optical element switching display and non-display has proceeded.

DETAILED DESCRIPTION

Figure 1:
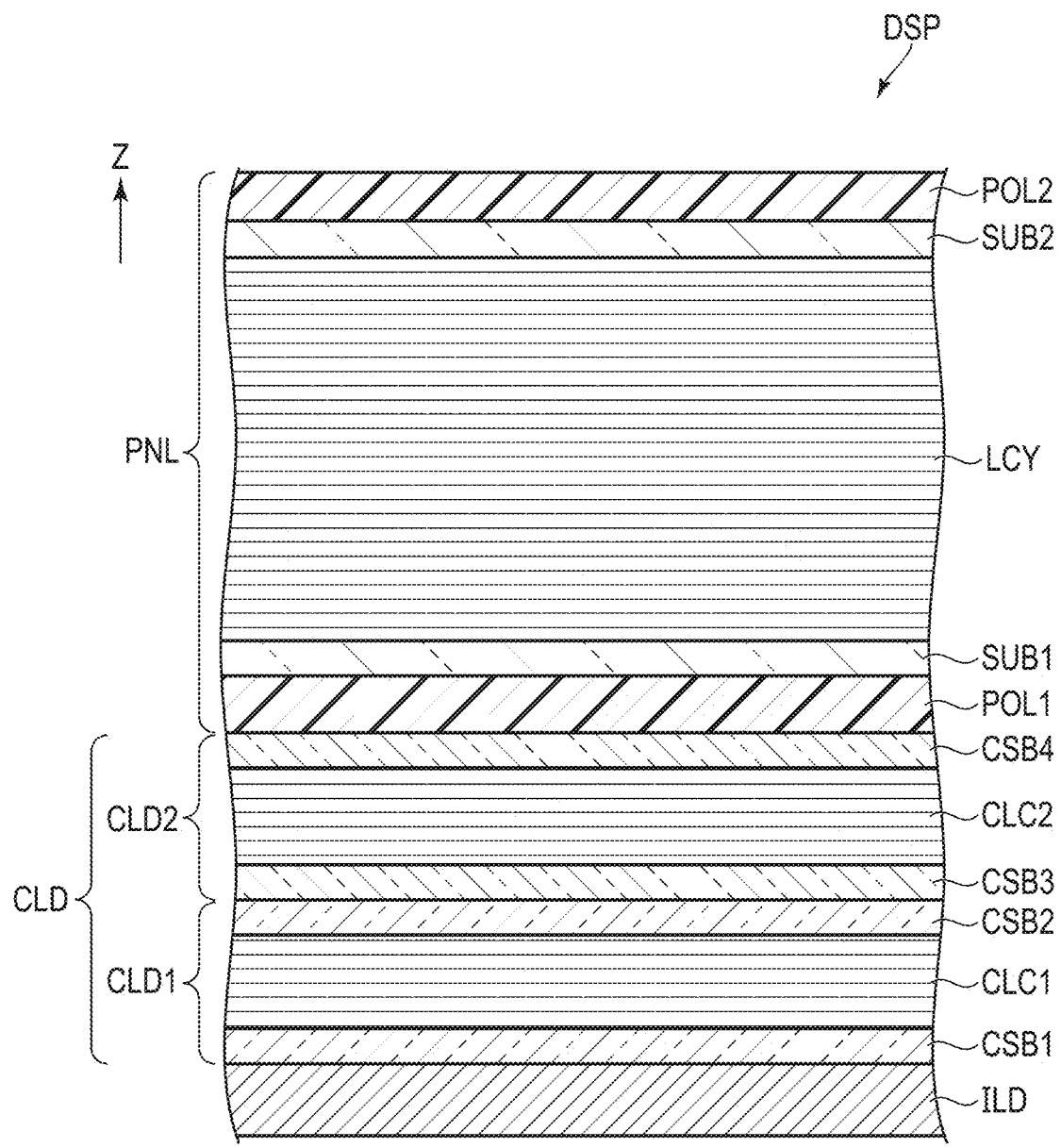
FIG. 1 is a cross-sectional view showing a schematic configuration of a liquid crystal display device according to an embodiment.

According to one embodiment, a liquid crystal display device comprises, an illumination device; a first liquid crystal device; a second liquid crystal device; and a liquid crystal display panel, the first liquid crystal device including: a first substrate including a first electrode thereon; a second substrate including a second electrode thereon; and a first cholesteric liquid crystal layer sandwiched between the first substrate and the second substrate, the second liquid crystal device including: a third substrate including a third electrode thereon; a fourth substrate including a fourth electrode thereon; and a second cholesteric liquid crystal layer sandwiched between the third substrate and the fourth substrate, the liquid crystal display panel including: a fifth substrate; a sixth substrate; a third liquid crystal layer sandwiched between the fifth substrate and the sixth substrate; a first polarizer provided on a side opposite to a surface opposed to the third liquid crystal layer, of surfaces of the fifth substrate; and a second polarizer provided on a side opposite to a surface opposed to the third liquid crystal layer, of surfaces of the sixth substrate, wherein the first cholesteric liquid crystal layer reflects one of left-handed circularly polarized light and right-handed circularly polarized light, of light in a blue light wavelength range, in a planar state, the second cholesteric liquid crystal layer reflects the other of the left-handed circularly polarized light and the right-handed circularly polarized light, of the light in the blue light wavelength range, in the planar state, the first liquid crystal device and the second liquid crystal device are stacked successively.

According to another embodiment, a liquid crystal display device comprises, an illumination device; a first liquid crystal device; a retardation film making a quarter-wave phase difference; and a liquid crystal display panel, the first liquid crystal device including: a first substrate including a first electrode thereon; a second substrate including a second electrode thereon; and a first cholesteric liquid crystal layer sandwiched between the first substrate and the second substrate, the liquid crystal display panel including: a third substrate; a fourth substrate; a second liquid crystal layer sandwiched between the third substrate and the fourth substrate; a first polarizer provided on a side opposite to a surface opposed to the second liquid crystal layer, of surfaces of the third substrate; and a second polarizer provided on a side opposite to a surface opposed to the second liquid crystal layer, of surfaces of the fourth substrate, wherein the first cholesteric liquid crystal layer reflects one of left-handed circularly polarized light and right-handed circularly polarized light, of light in a blue light wavelength range, in a planar state, the retardation film changes the other of the left-handed circularly polarized light and the right-handed circularly polarized light, of the light in the blue light wavelength range, to linearly polarized light, the first liquid crystal device is provided between the illumination device and the liquid crystal display panel, the retardation film is provided between the liquid crystal display panel and the first liquid crystal device.

The embodiment can provide a liquid crystal display device capable of maintaining high display quality while reducing blue light.

Each of embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

A liquid crystal display device according to one of the embodiments will be described hereinafter with reference to the accompanying drawings.

In the embodiment, a first direction X, a second direction Y, and a third direction Z are orthogonal to each other, but may intersect at an angle other than 90 degrees. A direction toward a tip of an arrow indicating the third direction Z is referred to as an upper or upward direction, and a direction opposite to the direction toward the tip of the arrow indicating the third direction Z is referred to as a lower or downward direction. The first direction X, the second direction Y, and the third direction Z may be referred to as the X direction, the Y direction, and the Z direction, respectively.

In addition, expressions such as "a second member above a first member" and "a second member under a first member" mean that the second member may be in contact with the first member or may be located separately from the first member. In the latter case, a third member may be interposed between the first member and the second member. In contrast, according to "a second member above a first member" and "a second member under a first member", the second member may be in contact with the first member.

In addition, an observation position at which the liquid crystal display device is to be observed is assumed to be located on the tip side of the arrow indicating the third direction Z, and viewing from the observation position toward an X-Y plane defined by the first direction X and the second direction Y is referred to as planar view. Viewing a cross-section of the liquid crystal display device on an X-Z plane defined by the first direction X and the third direction Z or a Y-Z plane defined by the second direction Y and the third direction Z is referred to as cross-sectional view.

[Embodiment]

FIG. 1 is a cross-sectional view showing a schematic configuration of a liquid crystal display device according to an embodiment. A liquid crystal display device DSP shown in FIG. 1 comprises an illumination device ILD, a liquid crystal device CLD, and a liquid crystal display panel PNL, which are stacked in this order along the third direction Z.

The liquid crystal display panel PNL comprises a polarizer POL1, a substrate SUB1, a liquid crystal layer LCY, a substrate SUB2, and a polarizer POL2. The liquid crystal layer LCY is held between the substrates SUB1 and SUB2.

The liquid crystal layer LCY functions as a display function layer. The liquid crystal layer LCY may be a layer of a liquid crystal material different from a cholesteric liquid crystal layer to be described later. The polarizer POL1 is provided on a side opposite to a surface opposed to the liquid crystal layer LCY, of surfaces of the substrate SUB1. The polarizer POL2 is provided on a side opposite to a surface opposed to the liquid crystal layer LCY, of surfaces of the substrate SUB2.

The liquid crystal device CLD comprises two liquid crystal devices CLD1 and CLD2. In other words, the liquid crystal device CLD is a stacked layer body of the liquid crystal devices CLD1 and CLD2. The liquid crystal device CLD1 comprises a substrate CSB1, a cholesteric liquid crystal layer CLC1, and a substrate CSB2. The liquid crystal device CLD2 comprises a substrate CSB3, a cholesteric liquid crystal layer CLC2, and a substrate CSB4. The cholesteric liquid crystal layer CLC2 is formed of a liquid crystal material different from that of the cholesteric liquid crystal layer CLC1. For example, the cholesteric liquid crystal layer CLC1 is formed of a liquid crystal material that reflects left-handed circularly polarized light, and the cholesteric liquid crystal layer CLC2 is formed of a liquid crystal material that reflects right-handed circularly polarized light, which will be described later.

The illumination device ILD is a so-called backlight which emits light upwardly. The illumination device ILD may comprise, for example, a light source element such as a light emitting diode (LED) and, for example, a light guide, a diffuser plate, or other optical elements. The light emitted from the illumination device ILD is made incident on the liquid crystal device CLD. The emitted light includes light having a wavelength range of blue light, more specifically, a wavelength in a range from 380 to 500 nm and is, for example, white light. In the embodiment, the wavelength range of blue light is referred to as a blue light wavelength range.

Figure 2A:
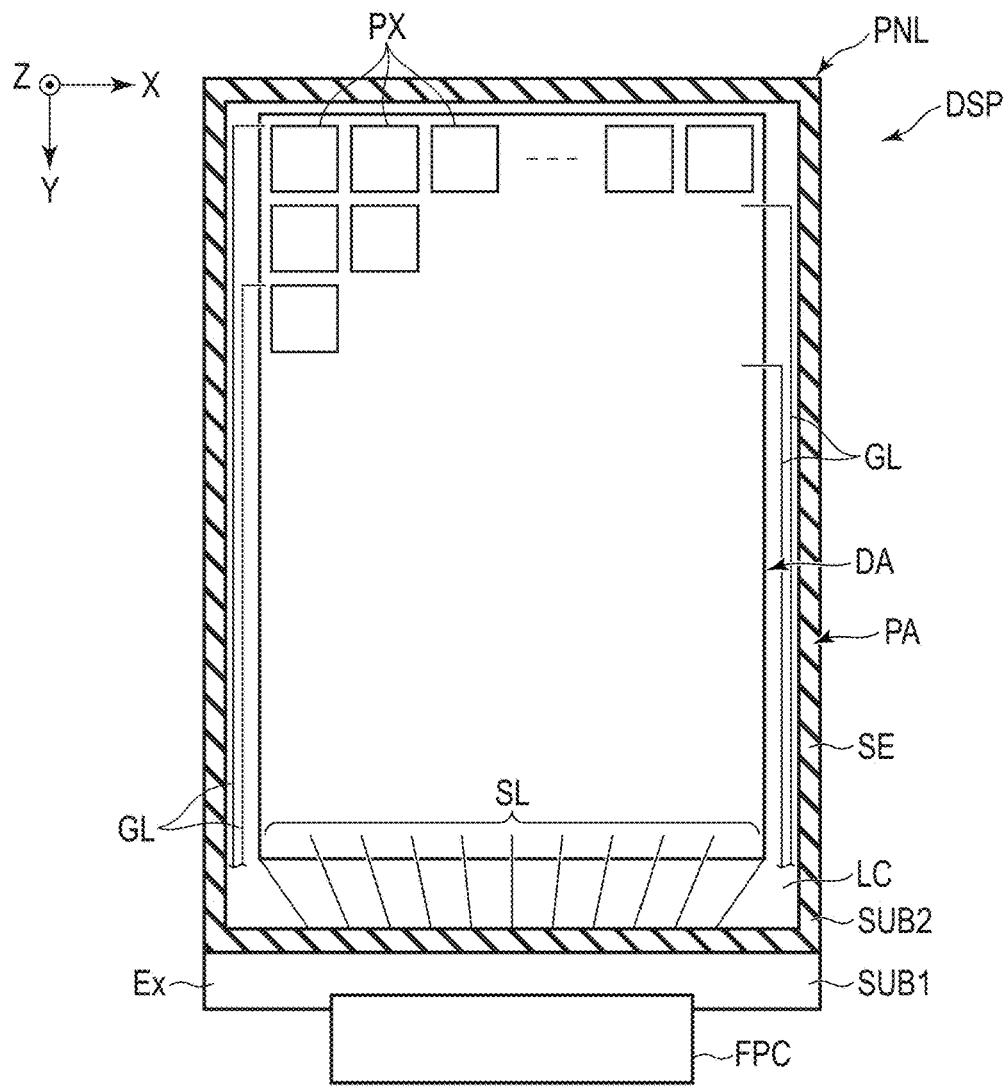
FIG. 2A is a plan view showing a schematic configuration of the liquid crystal display panel according to the embodiment.
Figure 2B:
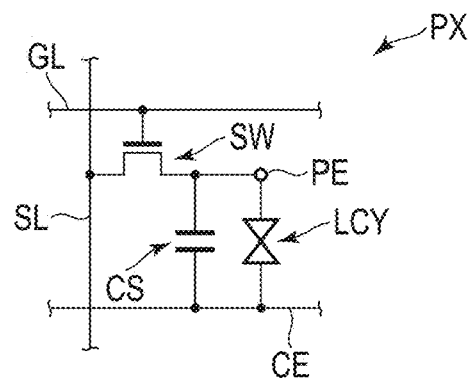
FIG. 2B is a partially enlarged view of FIG. 2A.

First, the liquid crystal display panel PNL will be described. FIG. 2A is a plan view showing a schematic configuration of the liquid crystal display panel according to the embodiment. FIG. 2B is a partially enlarged view of FIG. 2A.

In the embodiment, the first direction X and the second direction Y correspond to the directions parallel to a main surface of a substrate constituting the liquid crystal display panel PNL.

The liquid crystal display panel PNL comprises a substrate SUB1 (array substrate), a substrate SUB2 (counter-substrate), a liquid crystal layer LCY, and a seal SE. The substrate SUB1 and the substrate SUB2 are formed in a flat plate shape parallel to the X-Y plane and are opposed to each other in the third direction Z. The seal SE is formed in, for example, a loop shape and adheres the substrate SUB1 to the substrate SUB2. The liquid crystal layer LCY is disposed between the substrate SUB1 and the substrate SUB2, and is sealed by the seal SE.

The liquid crystal display panel PNL has a display area DA on which an image is displayed and a frame-shaped peripheral area PA that surrounds the display area DA. The seal SE is disposed in the peripheral area PA. The display area DA includes a plurality of pixels PX arrayed in a matrix in the first direction X and the second direction Y.

As shown and enlarged in FIG. 2B, each pixel PX comprises a switching element SW, a pixel electrode PE, and a common electrode CE. The switching element SW is constituted by, for example, a thin-film transistor (TFT) and is electrically connected to a scanning line GL and a signal line SL. The scanning line GL is electrically connected to the switching element SW in each of the pixels PX arranged in the first direction X. The signal line SL is electrically connected to the switching element SW in each of the pixels PX arranged in the second direction Y. The pixel electrode PE is electrically connected to the switching element SW. The common electrode CE is provided commonly to a plurality of pixel electrodes PE. The liquid crystal layer LCY is driven by an electric field produced between the pixel electrode PE and the common electrode CE. A capacitor CS is formed between, for example, an electrode having the same electric potential as the common electrode CE and an electrode having the same potential as the pixel electrode PE.

The scanning line GL, the signal line SL, the switching element SW, the pixel electrode PE, and the common electrode CE are provided on the substrate SUB1. The scanning line GL extends in the peripheral area PA and is electrically connected to a wiring board FPC. The signal line SL extends in the peripheral area PA and is electrically connected to the wiring board FPC.

The wiring board FPC is electrically connected to terminals disposed on an extended portion Ex of the substrate SUB1. The extended portion Ex corresponds to a portion of the substrate SUB1, which is not opposed to the substrate SUB2. For example, the wiring board FPC is a flexible printed circuit board. An IC chip may be mounted on the wiring board FPC or the extended portion Ex.

Figure 3:
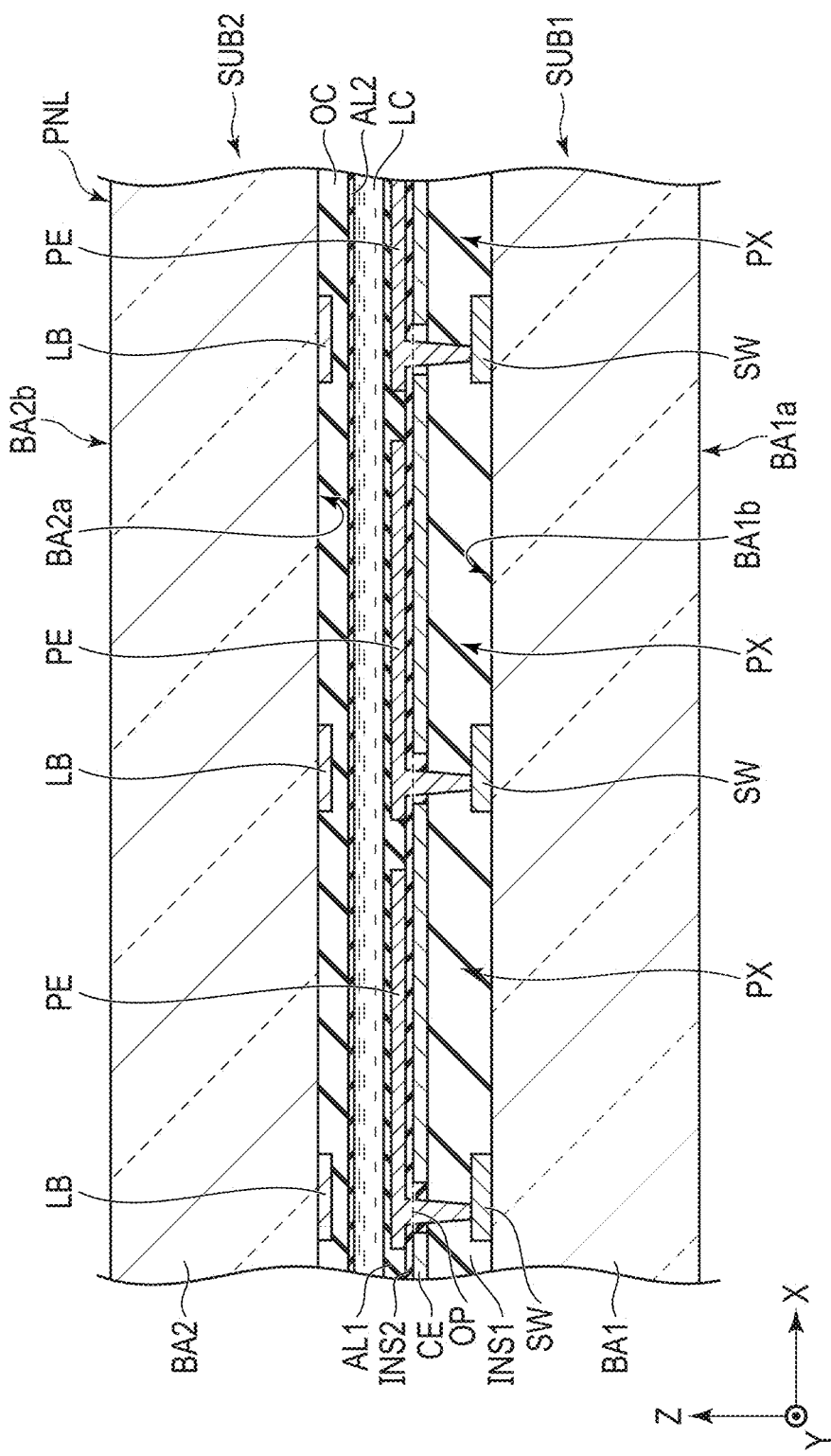
FIG. 3 is a cross-sectional view showing an example of the configuration applicable to the liquid crystal display panel shown in FIG. 2A and FIG. 2B.

FIG. 3 is a cross-sectional view showing an example of the configuration applicable to the liquid crystal display panel PNL shown in FIG. 2A and FIG. 2B. The substrate SUB1 comprises a base material BA1, switching elements SW, an insulating layer INS1, a common electrode CE, an insulating layer INS2, pixel electrodes PE, and an alignment film AL1. The base material BA1 has a first surface BA1a and a second surface BA1b on a side opposite to the first surface material BA1a.

The switching elements SW are disposed on the second surface BA1b side. The insulating layer INS1 covers the switching elements SW. The switching elements SW are simply illustrated in FIG. 3 but, actually, the switching elements SW include semiconductor layers, and various electrodes and lines such as gate electrodes (scanning lines GL) and source electrodes (signal lines SL).

The common electrode CE is disposed between the insulating layers INS1 and INS2. The common electrode CE is disposed across a plurality of pixels PX and opposed to a plurality of pixel electrodes PE in the third direction Z.

The pixel electrodes PE are disposed between the insulating layer INS2 and the alignment film AL1, for the respective pixels PX. The pixel electrode PE is electrically connected to the switching element SW through an opening portion OP of the common electrode CE. The pixel electrode PE is opposed to the common electrode CE with the insulating layer INS2 sandwiched therebetween. The liquid crystal layer LCY is driven by an electric field produced between the pixel electrode PE and the common electrode CE. The alignment film AL1 covers the pixel electrodes PE. The liquid crystal display panel PNL of the embodiment is a liquid crystal display panel which drives the liquid crystal layer LCY by a so-called lateral electric field but is not limited to this. The pixel electrodes PE may be provided on the substrate SUB1, the common electrode CE may be provided on the substrate SUB2, and the liquid crystal layer LCY may be driven by a so-called longitudinal electric field.

The substrate SUB2 comprises a base material BA2, a light shielding layer LB, an overcoat layer (insulating layer) OC, and an alignment film AL2. The base material BA2 has a first surface BA2a opposed to the substrate SUB1, and a second surface BA2b on a side opposite to the first surface material BA2a.

The light shielding layer LB is disposed on the first surface BA2a side. For example, the light shielding layer LB is opposed to the switching elements SW. The overcoat layer OC covers the light shielding layer LB and the first surface BA2a of the base material BA2. Color filters are provided between the overcoat OC and the first surface BA2a in accordance with the respective pixels PX, which is not illustrated in the figure. The alignment film AL2 covers the overcoat layer OC. The liquid crystal layer LCY is disposed between the alignment films AL1 and AL2 and is in contact with the alignment films AL1 and AL2.

The base material BA1 and the base material BA2 are, for example, transparent insulating base materials such as glass substrates or plastic substrates. The insulating layer INS1 is formed of, for example, a transparent insulating material such as silicon oxide, silicon nitride, silicon oxynitride or acrylic resin. For example, the insulating layer INS1 includes an inorganic insulating film and an organic insulating film. The insulating layer INS2 is, for example, an inorganic insulating film of silicon nitride or the like. The pixel electrodes PE and the common electrode CE are transparent electrodes formed of, for example, a transparent conductive material such as indium tin oxide (ITO) or indium zinc oxide (IZO). The overcoat layer OC is formed of, for example, a transparent insulating material such as acrylic resin.

Figure 4:
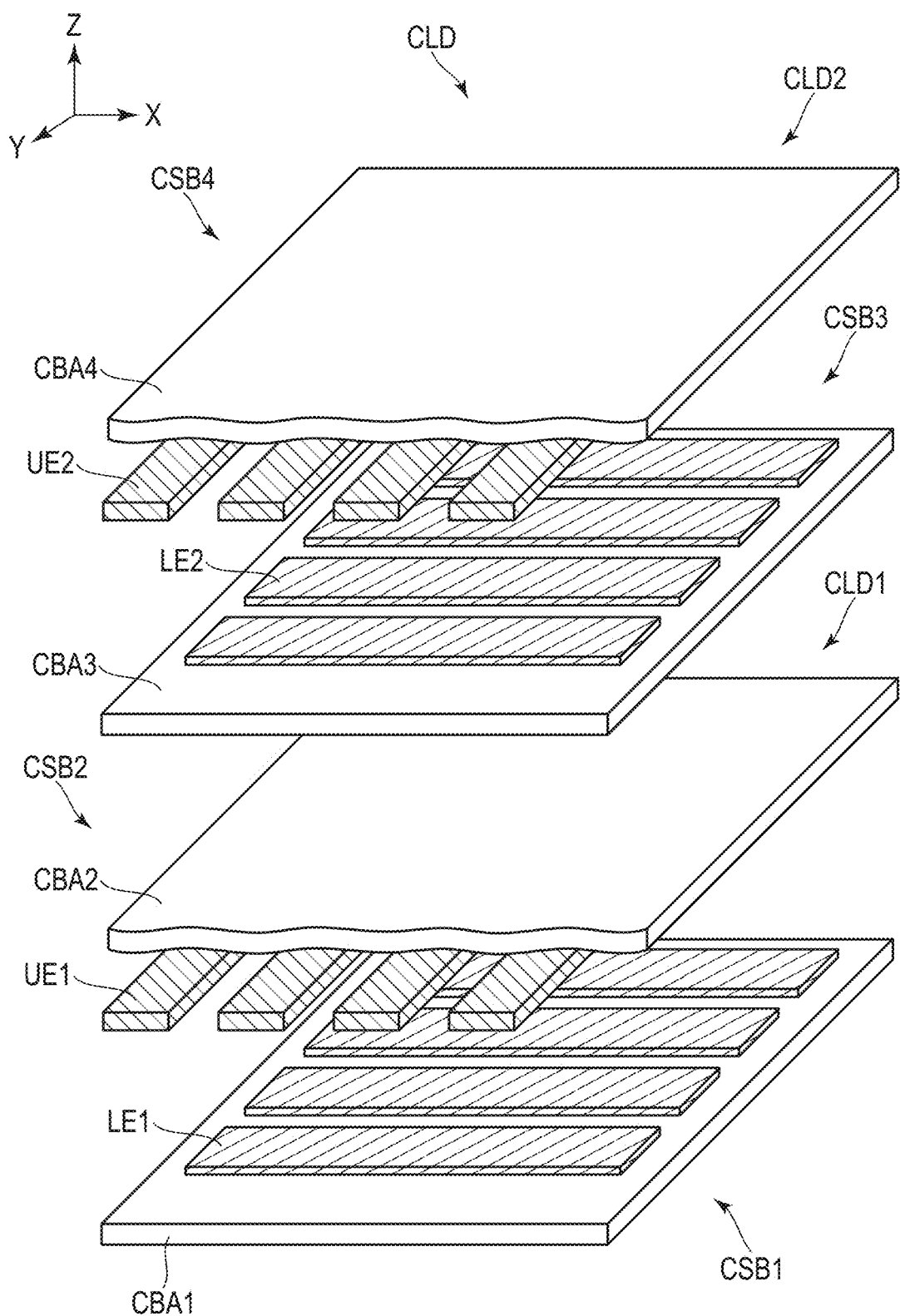
FIG. 4 is an exploded perspective view showing an example of the configuration applicable to the liquid crystal device.

A detailed configuration of the liquid crystal device CLD will be described. FIG. 4 is an exploded perspective view showing an example of the configuration applicable to the liquid crystal device. The liquid crystal device CLD1 of the liquid crystal device CLD comprises a base material CBA1, strip electrodes LE1, strip electrodes UE1, and a base material CBA2. The substrate CSB1 shown in FIG. 1 includes the base material CBA1 and the strip electrodes LE1. The base material CBA2 comprises the strip electrodes UE1 and the base material CBA2.

The strip electrodes LE1 are provided to be in contact with the base material CBA1, extend in the first direction X, and are arranged parallel along the second direction Y. The strip electrodes UE1 are provided to be in contact with the base material CBA2, extend in the second direction Y, and are arranged parallel along the first direction X.

Alignment films are provided to cover the strip electrodes LE1 and UE1, respectively, though not shown in FIG. 4. The cholesteric liquid crystal layer CLC1 shown in FIG. 1 is provided between the substrates CSB1 and CSB2, more specifically, between the alignment films covering the respective strip electrodes LE1 and UE1.

The cholesteric liquid crystal layer CLC1 is a liquid crystal layer formed of a cholesteric liquid crystal material. The cholesteric liquid crystal layer CLC1 is driven by an electric field produced between the strip electrodes LE1 and UE1, which is a so-called longitudinal electric field.

The liquid crystal device CLD2 comprises a base material CBA3, strip electrodes LE2, strip electrodes UE2, and a base material CBA4. The substrate CSB2 shown in FIG. 1 includes the base material CBA3 and the strip electrodes LE2. The base material CSB4 comprises the strip electrodes UE2 and the base material CBA4.

The strip electrodes LE2 are provided to be in contact with the base material CBA1, extend in the first direction X, and are arranged parallel along the second direction Y. The strip electrodes UE2 are provided to be in contact with the base material CBA2, extend in the second direction Y, and are arranged parallel along the first direction X.

Alignment films are provided to cover the strip electrodes LE2 and UE2, respectively, though not shown in FIG. 4. The cholesteric liquid crystal layer CLC2 shown in FIG. 1 is provided between the substrates CSB3 and CSB4, more specifically, between the alignment films covering the respective strip electrodes LE1 and UE1.

The cholesteric liquid crystal layer CLC2 is a liquid crystal layer formed of a cholesteric liquid crystal material, similarly to the cholesteric liquid crystal layer CLC1. The cholesteric liquid crystal layer CLC2 is driven by an electric field produced between the strip electrodes LE2 and UE2, which is a so-called longitudinal electric field.

The liquid crystal devices CLD1 and CLD2 are so-called passive-matrix liquid crystal devices.

The material of the base materials CBA1, CBA2, CBA3, and CBA4 may be a transparent insulating material, similarly to the base materials BA1 and BA2.

The strip electrodes LE1, LE2, UE1, and UE2 may be formed of the same transparent conductive material as the pixel electrodes PE and the common electrode CE.

Figure 5A:
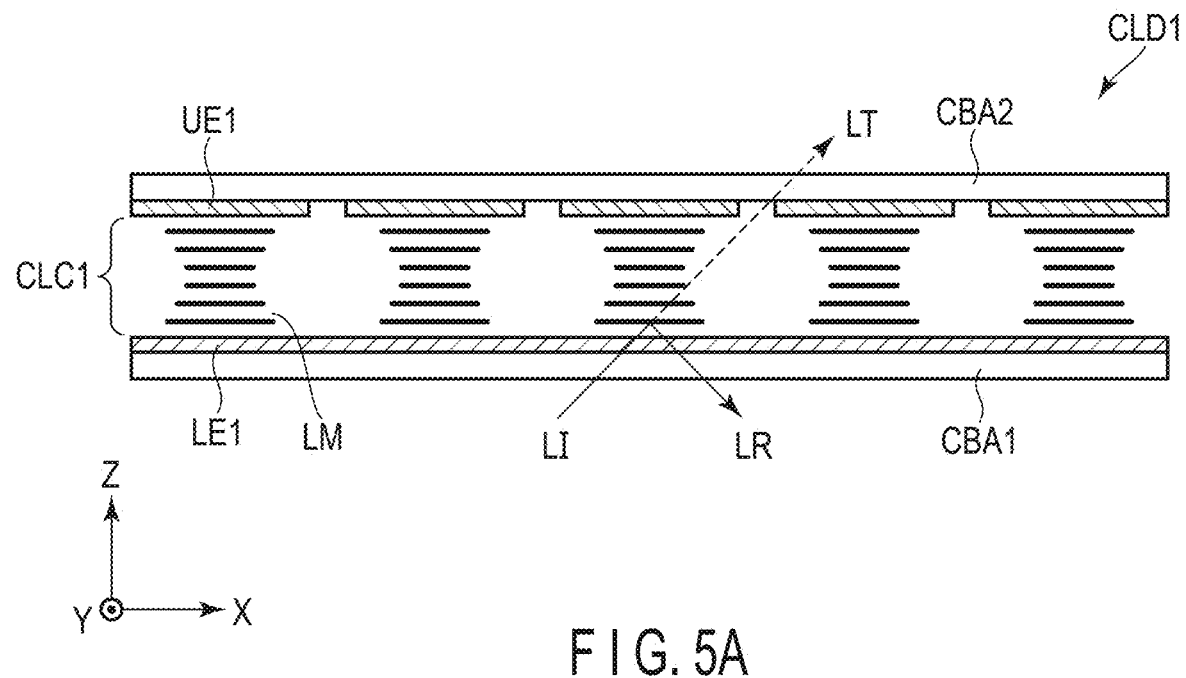
FIG. 5A is a view showing an aligned state of liquid crystal molecules of the cholesteric liquid crystal layer in a planar state.
Figure 5B:
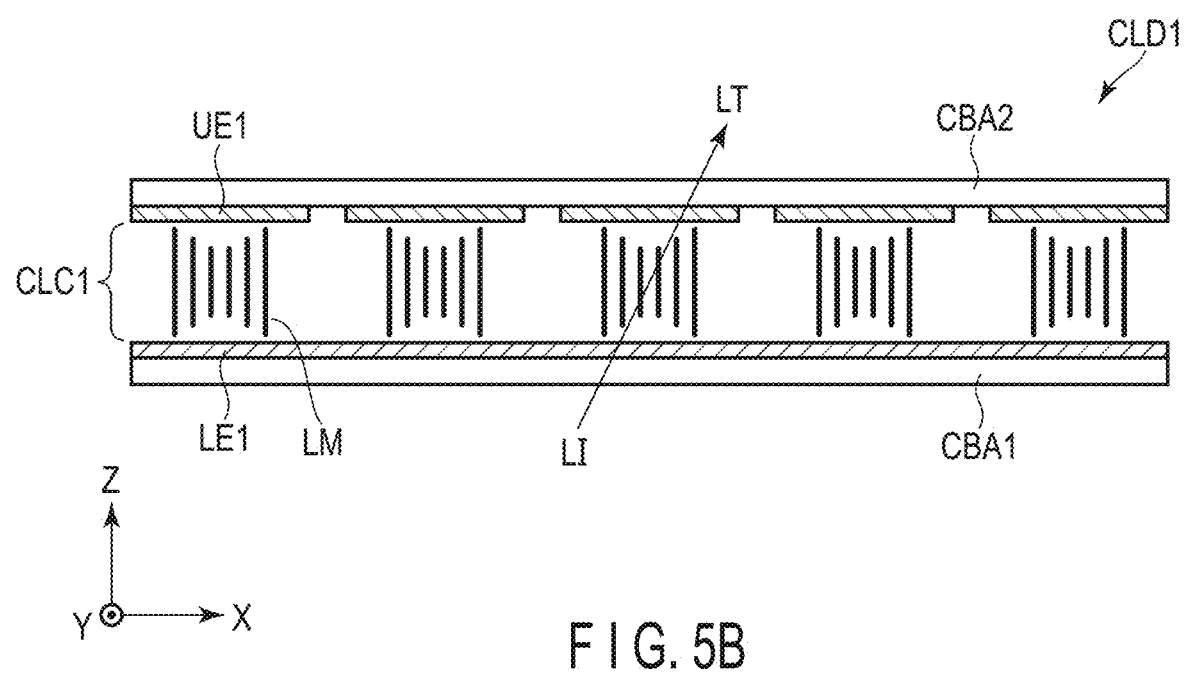
FIG. 5B is a view showing an aligned state of the liquid crystal molecules of the cholesteric liquid crystal layer in a focal conic state.

FIG. 5A and FIG. 5B are views illustrating alignment of the cholesteric liquid crystal layer. The cholesteric liquid crystal layer comprises a characteristic of bistability (memory property). The bistability means that the planer state of reflecting the light, the focal conic state of transmitting the light, or an intermediate state can be self-maintained. These states can be switched by adjusting the field strength applied to the cholesteric liquid crystal layer, i.e., the voltage between the electrodes sandwiching the cholesteric liquid crystal layer. FIG. 5A is a view showing an aligned state of liquid crystal molecules of the cholesteric liquid crystal layer in a planar state. FIG. 5B is a view showing an aligned state of the liquid crystal molecules of the cholesteric liquid crystal layer in a focal conic state. The cholesteric liquid crystal layer is described by using the liquid crystal device CLD1 in FIG. 5A and FIG. 5B, but that in the liquid crystal device CLD2 can also be described similarly.

As shown in FIG. 5A, liquid crystal molecules LM of the cholesteric liquid crystal layer in the planar state sequentially rotate in the third direction Z to form a helical structure. A helical axis of the helical structure is substantially perpendicular to the X-Y plane on which the strip electrodes UE1 and LE1 are provided. In other words, the helical axis of the helical structure extends along a direction parallel to the third direction Z.

In this state, light having a predetermined wavelength corresponding to the helical pitch of the liquid crystal molecules LM, of incident light LI, is selectively reflected on the cholesteric liquid crystal layer CLC1 as reflected light LR. When an average refractive index of the cholesteric liquid crystal layer is referred to as n and the helical pitch is referred to as p, wavelength λ by which the reflection is maximum is $\lambda = n \times p$. When refractive indexes of a longer axis and a shorter axis of the cholesteric liquid crystal layer are referred to as ne and n0, respectively, the average refractive index n is represented as $n = (ne+n0)/2$ (Expression 1). Part of the incident light LI other than the reflected light LR is transmitted as transmitted light LT and emitted from the liquid crystal device CLD1.

A pitch p of the cholesteric liquid crystal layer depends on the type of a chiral agent or a dopant concentration c together with a polymeric liquid crystal compound upon forming the cholesteric liquid crystal layer. When a constant of proportionality specific to the chiral agent is referred to as β, the wavelength λ can be represented as $$\lambda = n \times p = n/(\beta \times c)$$ (Expression 2).

A half width Δλ of a selective reflection band indicating polarization selective reflection depends on birefringence Δn of the cholesteric liquid crystal layer and the pitch p, and can be represented as $\Delta\lambda = \Delta n \times p$ (Expression 3). Δn can be adjusted by controlling the type and mixture ratio of the polymerizable liquid crystal compounds, or the temperature at which the alignment is fixed when the cholesteric liquid crystal layer is formed.

In the liquid crystal device CLD of the embodiment, the stacked cholesteric liquid crystal layers CLC1 and CLC desirably have the refractive index Δn and the pitch p that reflect the light having central wavelength λ of 380 nm or more and 500 nm or less, preferably 430 nm or more and 440 nm or less.

In the focal conic state, the liquid crystal molecules of the cholesteric liquid crystal layer sequentially rotate in a direction perpendicular to the third direction Z, i.e., a direction parallel to the X-Y plane to form a helical structure. The helical axis of the helical structure extends in a direction parallel to the X-Y plane. In the focal conic state, selectivity of the reflective wavelength is lost in the cholesteric liquid crystal layer CLC1 and most of the incident light LI is transmitted as the transmitted light LT.

The cholesteric liquid crystal layer exists in the planar state or the focal conic state when no voltage is applied. When a low voltage pulse is applied, the cholesteric liquid crystal layer is changed to the focal conic state. In contrast, when a high voltage pulse is applied to the cholesteric liquid crystal layer in a mixed state of the planar state and the focal conic state or in the focal conic state and the cholesteric liquid crystal layer is held as it is, the cholesteric liquid crystal layer becomes the planar state.

Figure 6:
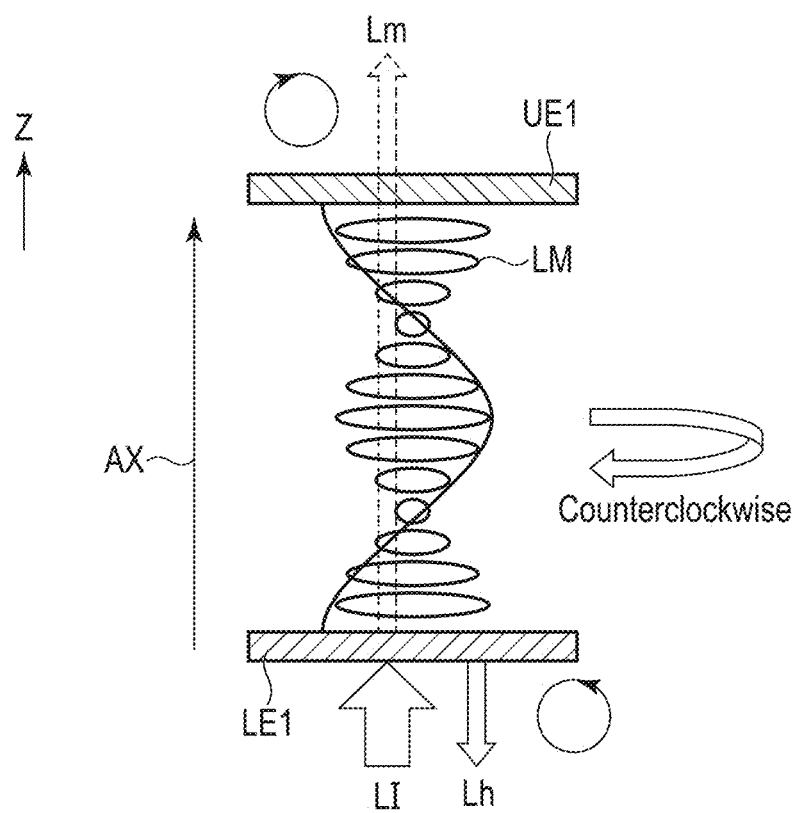
FIG. 6 is a view illustrating the reflection of circularly polarized light on the cholesteric liquid crystal layer.

FIG. 6 is a view illustrating the reflection of circularly polarized light on the cholesteric liquid crystal layer. The cholesteric liquid crystal layer is a layer of the material in which the liquid crystal molecules LM and reflects circularly polarized light in the same direction as a rotation direction of the helical structure.

Selective reflection of the right-handed circularly polarized light and the left-handed circularly polarized light can be performed by changing the rotation direction of the helix in each cholesteric liquid crystal layer. The rotation direction of the helix in the cholesteric liquid crystal layer is determined by the structure of the liquid crystal molecules (for example, functional groups of side chains) or the type of the chiral agent. More specifically, whether the right-handed circularly polarized light or the left-handed circularly polarized light is to be reflected is determine by combining an absolute arrangement of chiral carbons, the backbone, and the odd number or even number of spacer atoms to the chiral carbons. In FIG. 6, the liquid crystal molecules LM form a left-handed (counterclockwise) helix. The helical axis AX is parallel to the third direction Z. The left-handed circularly polarized light Lh, in the same direction as the helical direction of the helical structure, of the incident light LI, is reflected while the right-handed circularly polarized light Lm is transmitted.

Figure 7:
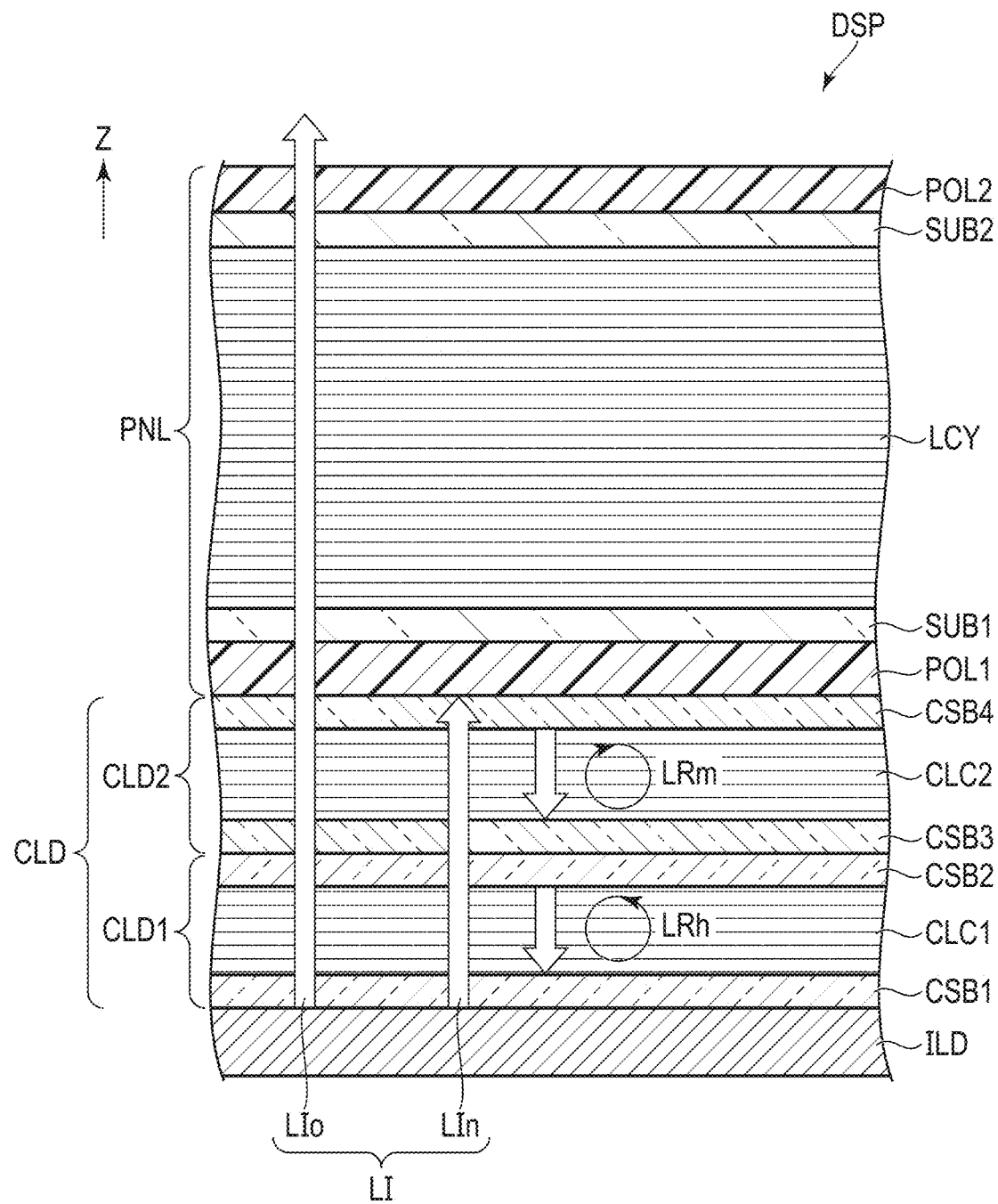
FIG. 7 is a cross-sectional view showing the liquid crystal display device according to the embodiment.

In the liquid crystal device of the embodiment, the selective reflectivity of the planar state is used to reflect the light in the blue light wavelength range. FIG. 7 is a cross-sectional view showing the liquid crystal display device according to the embodiment.

The emitted light which is emitted from the illumination device ILD is made incident on the liquid crystal device CLD as the incident light LI. The incident light LI includes light LIn in the blue light wavelength range and light LIo in a wavelength range other than the blue light wavelength range.

The light LIn is made incident on the liquid crystal device CLD1 of the liquid crystal device CLD. The cholesteric liquid crystal layer CLC1 of the liquid crystal device CLD1 reflects the left-handed circularly polarized light of the light LIn as reflected light LRh. To reflect the left-handed circularly polarized light, adjustment may be performed by controlling the type, ratio, or additive temperature of the chiral agents, the type and mixture ratio of the polymerizable liquid crystal compounds, or the temperature at which the alignment is fixed, when the cholesteric liquid crystal layer CLC1 is formed as described above. As described above, the circularly polarized light component in the same direction as the helical direction of the helical structure of the liquid crystal molecules LM is reflected. The light is reflected in the cholesteric liquid crystal layer CLC2 to be described below in the same manner.

The light emitted from the liquid crystal device CLD1 is made incident on the liquid crystal device CLD2. The right-handed circularly polarized light of the light made incident on the liquid crystal device CLD2 is reflected as reflected light LRm. As a result, all the light LIn in the blue light wavelength range is reflected and is not made incident on the liquid crystal display panel PNL.

In the embodiment, the liquid crystal device CLD1 reflects the left-handed circularly polarized light and the liquid crystal device CLD 2 reflects the right-handed circularly polarized light, but the embodiment is not limited to this. One of the liquid crystal devices CLD1 and CLD2 may reflect one of the left-handed circularly polarized light and the right-handed circularly polarized light, and the other of the liquid crystal devices CLD1 and CLD2 may reflect the other of the left-handed circularly polarized light and the right-handed circularly polarized light.

The light LIo other than the light LIn is transmitted through the liquid crystal devices CLD1 and CLD2 and is made incident on the liquid crystal display panel PNL. The liquid crystal display panel PNL performs a display operation using the light LIo.

It is assumed here that the liquid crystal device CLD is not used, but a resin layer (blue light blocking layer) is used to reduce the above-described blue light. Such a blue light blocking layer may block not only the light in the blue light wavelength range, but also the blue light that the liquid crystal display panel PNL needs for display operation, i.e., the blue component of visible light. If the blue component is blocked, the color of the display image on the liquid crystal display panel PNL may shift to yellow. This may result in deterioration of the quality of the displayed image.

In the embodiment, since only the light in the blue light wavelength range can be blocked, high display quality can be maintained while reducing the blue light.

Figure 8:
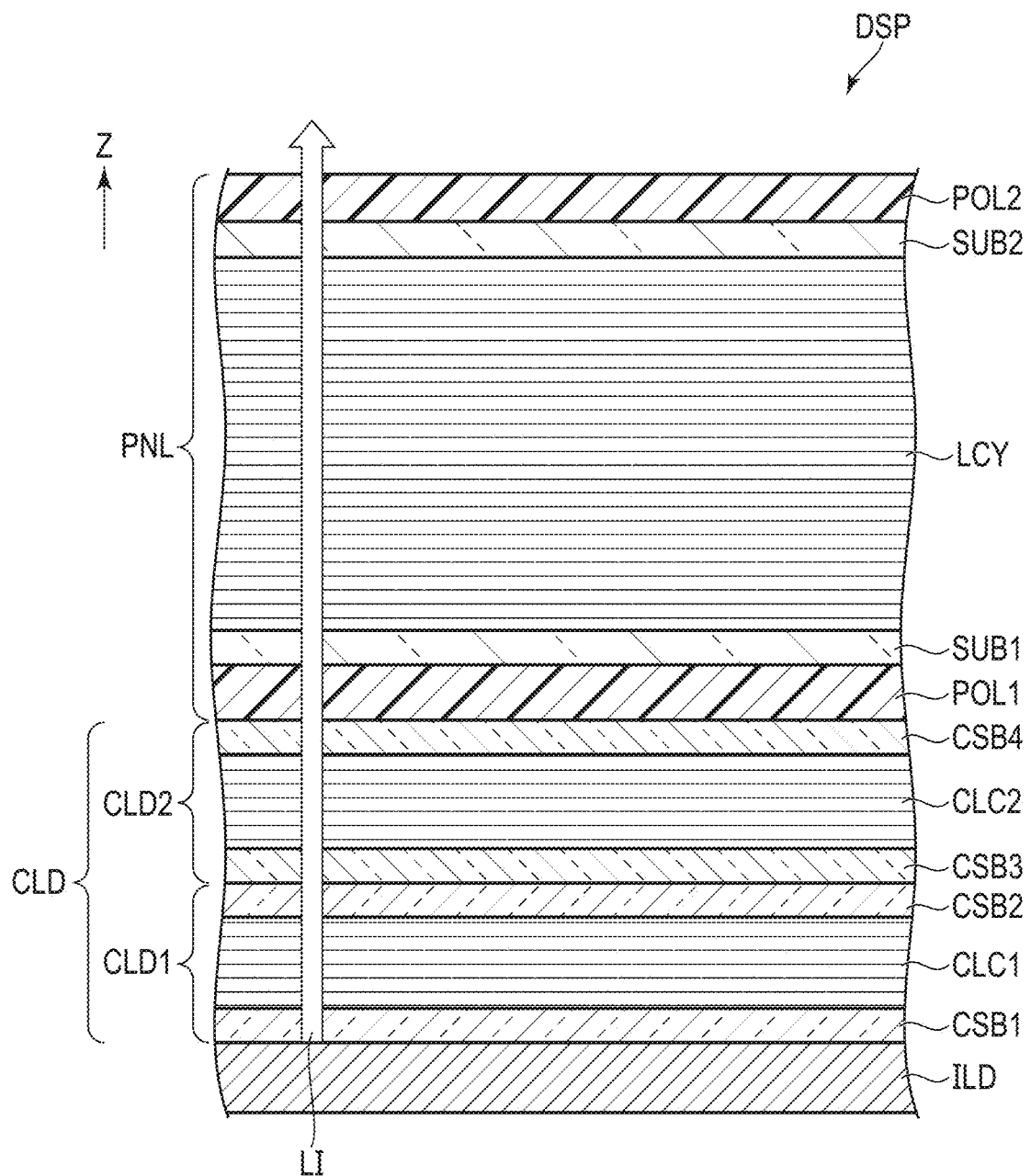
FIG. 8 is a cross-sectional view illustrating the liquid crystal display device according to the embodiment.

FIG. 8 is a cross-sectional view illustrating the liquid crystal display device according to the embodiment. Unlike FIG. 7, when all incident light, is to be transmitted, a voltage may be applied such that the cholesteric liquid crystal layers CLC1 and CLC2 become a focal conic state. In this case, as shown in FIG. 8, the liquid crystal display panel PNL can perform the display operation using all the incident light LI emitted from the illumination device ILD and made incident on the liquid crystal device CLD.

For example, when the liquid crystal display panel PNL displays characters (letters) and the like that do not require color display, a voltage may be applied such that the cholesteric liquid crystal layers CLC1 and CLC2 of the liquid crystal device CLD become the planar state as shown in FIG. 7. The light in the blue light wavelength range can be thereby prevented from being made incident on observer's eyes.

In contrast, when the liquid crystal display panel PNL displays images and the like that require color display, a voltage may be applied such that the cholesteric liquid crystal layers CLC1 and CLC2 of the liquid crystal device CLD become the focal conic state as shown in FIG. 8.

Alternatively, the display area DA of the liquid crystal display panel PNL may be divided to provide areas that do not require color display and areas that require color display. In the liquid crystal device CLD, the areas of the cholesteric liquid crystal layers CLC1 and CLC2, which correspond to the areas that do not require color display, may set to the planar state, and the areas of the cholesteric liquid crystal layers CLC1 and CLC2, which correspond to the areas that require color display, may be set to the focal conic state. The planar state and the focal conic state may be switched by signals from an image processing unit provided in the liquid crystal display panel PNL. Alternatively, the planar state and the focal conic state may be switched by input from the observer.

Alternatively, when the light source elements emitting the blue color among the light source elements included in the illumination device ILD are classified into two types, one on the short wavelength side and the other on the long wavelength side, light having one of the short wavelength and the long wavelength, for example, the light having a wavelength range of 430 nm or more and 440 nm or less may be blocked and the light having the other of the short wavelength and the long wavelength may be transmitted. White balance can be thereby achieved in the display on the liquid crystal display panel PNL.

Figure 9:
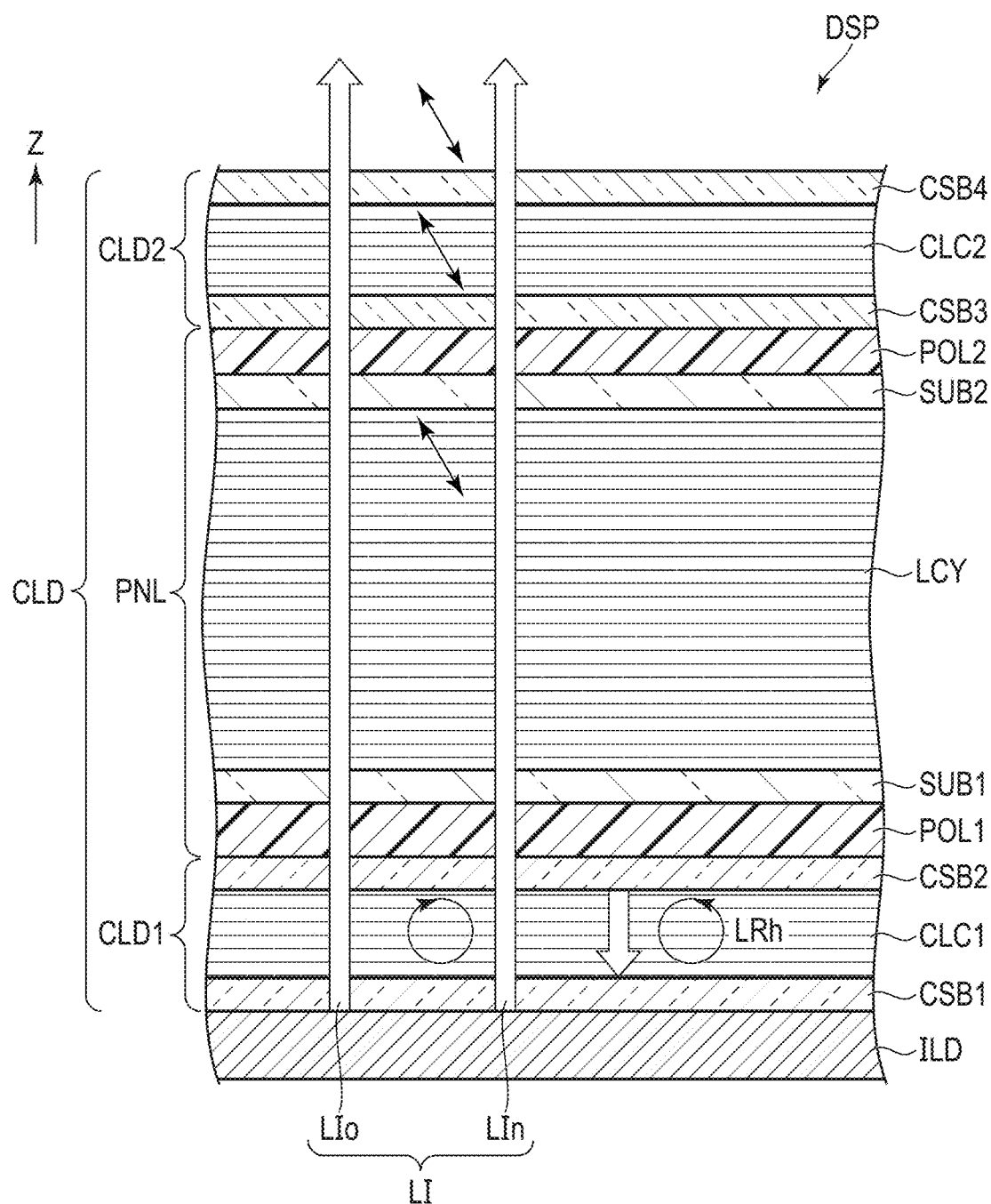
FIG. 9 is a cross-sectional view illustrating a liquid crystal display device according to a comparative example.

It should be noted that the liquid crystal devices CLD1 and CLD2 perform their functions by being stacked successively. FIG. 9 is a cross-sectional view illustrating a liquid crystal display device according to a comparative example. In the liquid crystal display device DSP shown in FIG. 9, the liquid crystal display panel PNL is sandwiched between the liquid crystal devices CLD1 and CLD2. In other words, the liquid crystal devices CLD1 and CLD2 are disposed separately from each other.

The left-handed circularly polarized light of the light LIn in the blue light wavelength range is reflected by the cholesteric liquid crystal layer CLC1 of the liquid crystal device CLD1 as the reflected light LRh, similarly to the example in FIG. 7. The right-handed circularly polarized light of the light LIn is made incident on the polarizer POL1 of the liquid crystal display panel PNL. The right-handed circularly polarized light is converted into linearly polarized light by the polarizer POL1. The linearly polarized light passes through the liquid crystal display panel PNL and is made incident on the liquid crystal device CLD2. The liquid crystal device CLD2 reflects circularly polarized light, but transmits linearly polarized light. Therefore, the right-handed circularly polarized light of the light LIn is not reflected but is emitted from the liquid crystal display device DSP and is made incident on observer's eyes.

In the liquid crystal display device DSP according to the comparative example, the blue light can only be blocked by one of right-handed circularly polarized light and the left-handed circularly polarized light, and cannot be completely blocked. Therefore, the liquid crystal devices CLD1 and CLD2 need to be stacked successively as a stacked layer body as described in the embodiment. It can be said that the liquid crystal devices CLD1 and CLD2 are in contact with each other.

As described above, the display device capable of maintaining high display quality while reducing the blue light can be obtained by the embodiment.

Configuration Example 1

Figure 10:
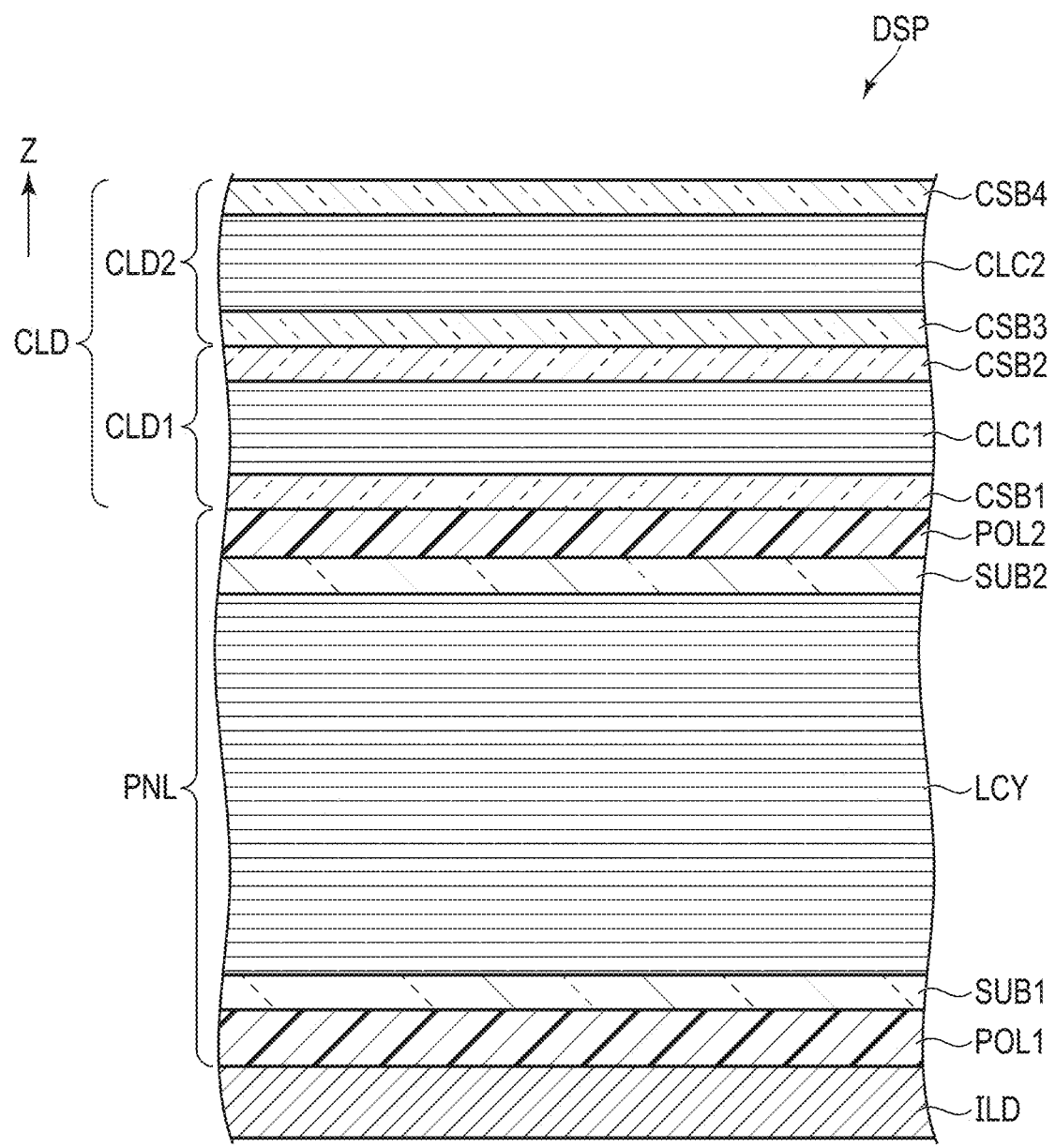
FIG. 10 is a cross-sectional view showing another configuration example of the liquid crystal display device according to the embodiment.

FIG. 10 is a cross-sectional view showing another configuration example of the liquid crystal display device according to the embodiment. The configuration example shown in FIG. 10 is different from the configuration example shown in FIG. 1 in that the liquid crystal device CLD is disposed above the liquid crystal display panel PNL.

In the liquid crystal display device DSP shown in FIG. 10, the liquid crystal display panel PNL is provided between the illumination device ILD and the liquid crystal device CLD. The liquid crystal device CLD is a stacked layer body in which the liquid crystal devices CLD1 and CLD1 and CLD2 are stacked successively.

In this configuration example, the liquid crystal device CLD shown in FIG. 1 also reflects the light in the wavelength range that becomes the blue light. Similarly to FIG. 7 and its descriptions, for example, the liquid crystal device CLD1 reflects the left-handed circularly polarized light, and the liquid crystal device CLD2 reflects the right-handed circularly polarized light.

In this configuration example, the same advantages as those in the embodiment can be achieved, too.

Configuration Example 2

Figure 11:
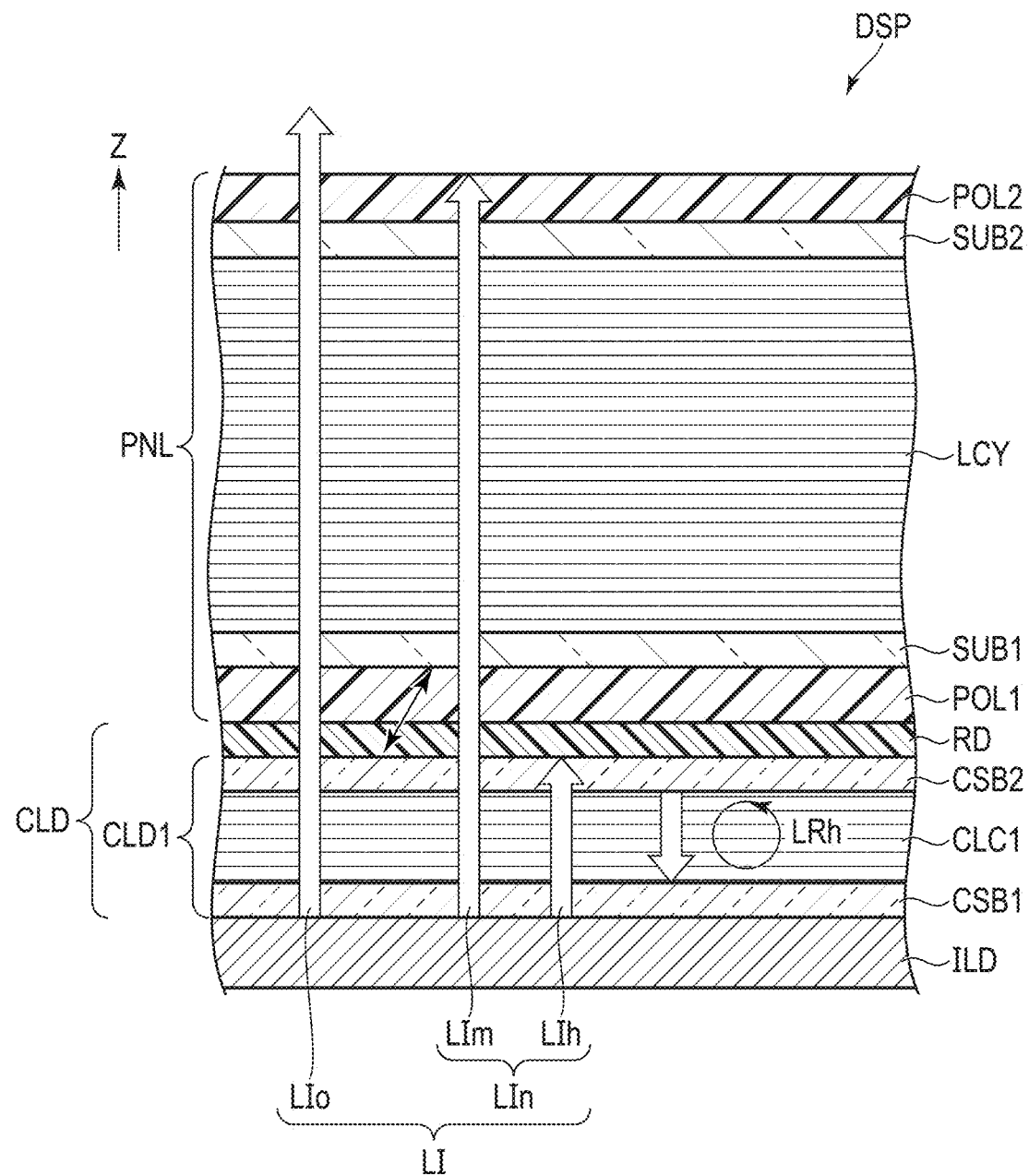
FIG. 11 is a cross-sectional view showing the other configuration example of the liquid crystal display device according to the embodiment.

FIG. 11 is a cross-sectional view showing the other configuration example of the liquid crystal display device according to the embodiment. The configuration example shown in FIG. 11 is different from the configuration example shown in FIG. 1 in that the liquid crystal device CLD is composed of the liquid crystal device CLD1 and a retardation film.

The liquid crystal display device DSP shown in FIG. 11 comprises the liquid crystal device CLD1 and the retardation film RD as the liquid crystal device CLD. The retardation film RD is a retardation film for making a quarter-wave phase difference. The liquid crystal device CLD1 is provided between the illumination device ILD and the liquid crystal display panel PNL. The retardation film RD is provided between the liquid crystal display panel PNL and the liquid crystal device CLD1. The retardation film RD is desirably disposed downward to prevent blue light reflection from ambient light.

Unlike FIG. 1, the liquid crystal display DSP does not comprise the liquid crystal device CLD 2, but comprises only one layer of the liquid crystal device CLD1.

The light emitted from the illumination device ILD is made incident on the liquid crystal device CLD as the incident light LI. The light LIn in the blue light wavelength range, of the incident light LI, includes right-handed circularly polarized incident light LIm and left-handed circularly polarized incident light LIh.

The right-handed circularly polarized incident light LIm is rotated by the retardation film RD and changes to linearly polarized light. This linearly polarized light is made incident on the liquid crystal display panel PNL and is absorbed by the polarizer POL1 or POL2. As a result, the right-handed circularly polarized incident light LIm cannot be emitted to the outside of the liquid crystal display DSP.

The left-handed circularly polarized incident light LIh is reflected as reflected light LRh by the cholesteric liquid crystal layer CLC1 of the liquid crystal device CLD1 as described with reference to FIG. 7. As a result, the left-handed circularly polarized incident light LIh cannot be emitted to the outside of the liquid crystal display DSP. Therefore, the liquid crystal display device DSP in this configuration example can block the light LIn in the blue light wavelength range.

In this configuration example, the cholesteric liquid crystal layer CLC1 of the liquid crystal device CLD1 reflects the left-handed circularly polarized incident light LIh, and the retardation film RD changes the right-handed circularly polarized incident light LIm to the linearly polarized light. However, the configuration example is not limited to this. The cholesteric liquid crystal layer CLC1 may reflect the right-handed circularly polarized incident light LIm, and the retardation film RD may change the left-handed circularly polarized incident light LIm to the linearly polarized light.

The light LIo in the wavelength range other than the blue light wavelength range, of the incident light LI, is neither reflected nor absorbed. The liquid crystal display panel PNL can perform the display operation with the light LIo.

In this configuration example, the same advantages as those in the embodiment can be achieved, too.

Configuration Example 3

Figure 12:
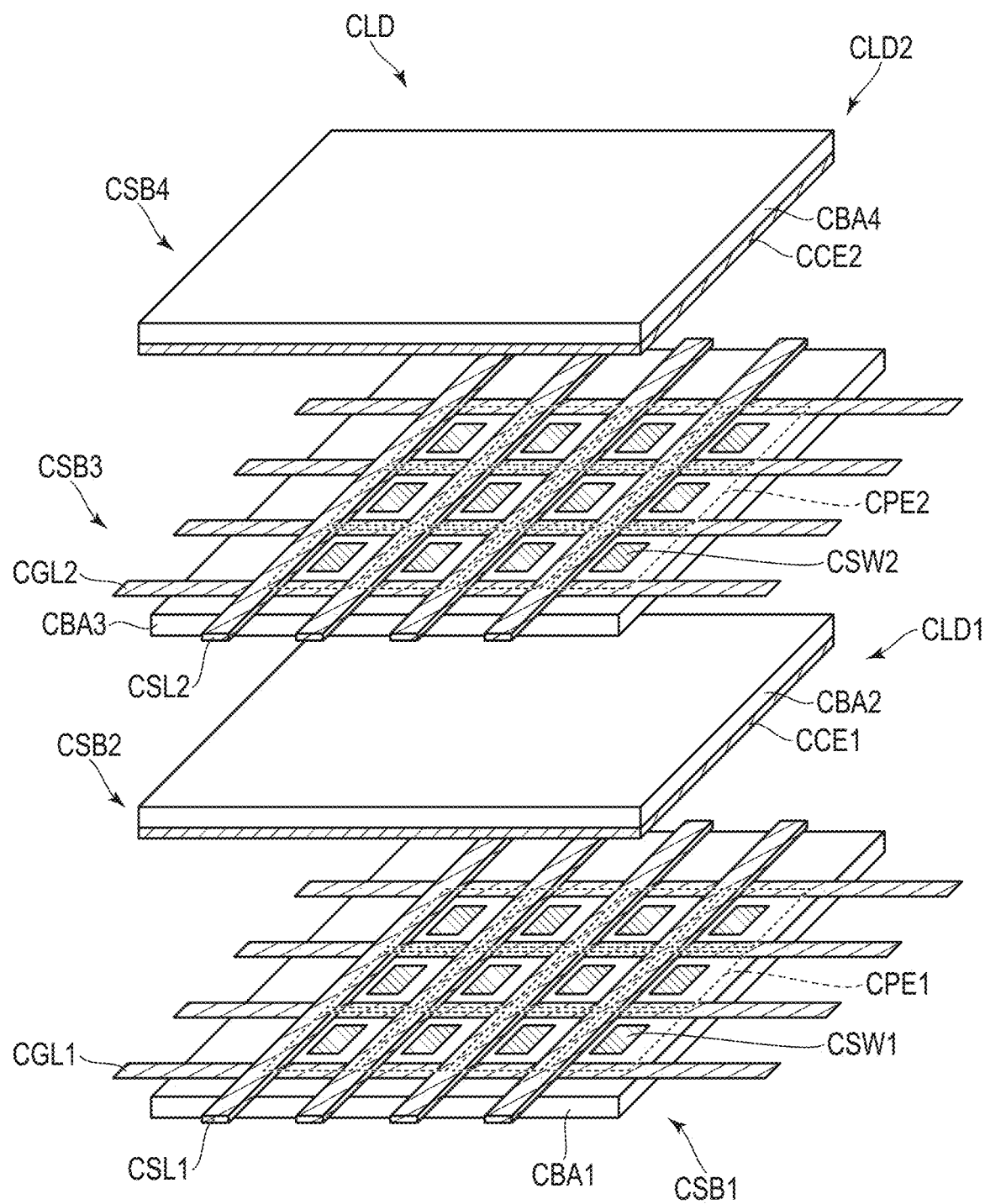
FIG. 12 is an exploded perspective view showing the other configuration example of the liquid crystal display device according to the embodiment.

FIG. 12 is an exploded perspective view showing the other configuration example of the liquid crystal display device according to the embodiment. The configuration example shown in FIG. 12 is different from the configuration example shown in FIG. 4 in that the liquid crystal devices CLD1 and CLD2 are active-matrix liquid crystal devices, respectively.

In the liquid crystal device CLD1 shown in FIG. 12, the substrate CSB1 comprises a substrate CBA1, scanning lines CGL1, signal lines CSL1, switching elements CSW1, and an individual electrode CPE1. A plurality of scanning lines CGL1 extend along the first direction X and are aligned along the second direction Y. A plurality of signal lines CSL1 extend along the second direction Y and are aligned along the first direction X.

One switching element CSW1 (for example, TFT) is provided at each of intersections of the plurality of scanning lines CGL1 and the plurality of signal lines CSL1. The plurality of switching elements CSW1 are connected to the plurality of scanning lines CGL1 and the plurality of signal lines CSL1, respectively.

The plurality of individual electrodes CPE1 are disposed in a matrix along the first direction X and the second direction Y. Each of the plurality of individual electrodes CPE1 is connected to one switching element CSW1. Each of the plurality of individual electrodes CPE1 may have, for example, a rectangular shape.

The substrate CBS2 comprises a base material CBA2 and a common electrode CCE1. The common electrode CCE1 is provided on an entire surface of the base material CBA2, which is opposed to the base material BA1. The common electrode CCE1 is considered to be provided on an entire surface of the substrate CSB1, which is in contact with the cholesteric liquid crystal layer CLC1. The common electrode CCE1 is formed of a so-called solid film.

The individual electrode CPE1 and the common electrode CCE1 may be formed of the same transparent conductive material as the pixel electrode PE and the common electrode CE.

Similarly to FIG. 1, the cholesteric liquid crystal layer CLC1 is provided between the substrates CSB1 and CSB2 of the liquid crystal device CLD1 shown in FIG. 12. Although not illustrated in FIG. 12, an alignment film is provided to cover each of the individual electrode CPE1 and the common electrode CCE1.

An electric field is generated between the individual electrode PE1 and the common electrode CCE1, based on a signal input to the switching element CSW1. The cholesteric liquid crystal layer CLC1 is driven by the electric field.

In the liquid crystal device CLD2, the substrate CSB3 comprises a base material CBA3, scanning lines CGL2, signal lines CSL2, switching devices CSW2, and an individual electrode CPE2. A substrate CBS4 comprises a base material CBA4 and a common electrode CCE2.

Similarly to FIG. 1, the cholesteric liquid crystal layer CLC2 is provided between the substrates CSB3 and CSB4 of the liquid crystal device CLD2. Although not illustrated in FIG. 12, an alignment film is provided to cover each of the individual electrode PE2 and the common electrode CCE2.

The configuration of the liquid crystal device CLD2 is the same as that of the liquid crystal device CLD1. Therefore, the above description is cited as detailed description, and detailed description is omitted here.

The liquid crystal devices CLD1 and CLD2 of the configuration example are active-matrix liquid crystal devices, respectively. In the active-matrix liquid crystal device, the planar state and the focal conic state can be switched for each switching element. When the display area DA of the liquid crystal display panel PNL is divided into areas that do not require color display and areas that require color display, the active-matrix liquid crystal device CLD (CLD1 and CLD2) can perform higher resolution control.

In this configuration example, the same advantages as those in the embodiment can be achieved, too.

In the disclosure, the strip electrodes (strip electrodes LE1, UE1, LE2, and UE2), the individual electrodes (individual electrodes PE1 and PE2), and the common electrodes (common electrodes CCE1 and CCE2) of the liquid crystal devices CLD are often simply referred to as electrodes.

The strip electrode LE1 and the individual electrode PE1 are often referred to as first electrodes. The strip electrode UE1 and the common electrode CCE1 are often referred to as second electrode. The strip electrode LE2 and the individual electrode PE2 are often referred to as third electrodes. The strip electrode UE2 and the common electrode CCE2 are often referred to as fourth electrodes.

The strip electrode LE1, the strip electrode UE1, the strip electrode LE2, and the strip electrode UE2 are often referred to as a first strip electrode, a second strip electrode, a third strip electrode, and a fourth strip electrode, respectively.

The individual electrodes PE1 and PE2 are also referred to as a first individual electrode and a second individual electrode, respectively. The common electrodes CCE1 and CCE2 are also referred to as a first common electrode and a second common electrode, respectively.

In the disclosure, the substrates CSB1, CSB2, CSB3, and CSB4 shown in FIG. 1 are referred to as a first substrate, a second substrate, a third substrate, and a fourth substrate, respectively. The cholesteric liquid crystal layers CLC1 and CLC2 are referred to as a first cholesteric liquid crystal layer and a second cholesteric liquid crystal layer, respectively.

In the disclosure, the substrates SUB1 and SUB2 of the liquid crystal display panel PNL shown in FIG. 1 are also referred to as a fifth substrate and a sixth substrate, respectively. In this case, the liquid crystal layer LCY of the liquid crystal display panel PNL is referred to as a third liquid crystal layer. As described above, the liquid crystal layer LCY is a layer of the liquid crystal material different from the cholesteric liquid crystal layer. The polarizers POL1 and POL2 are referred to as a first polarizer and a second polarizer, respectively.

In the liquid crystal display panel shown in FIG. 11, the substrates SUB1 and SUB2 are often referred to as a third substrate and a fourth substrates, respectively. In this case, the liquid crystal layer LCY of the liquid crystal display panel PNL is referred to as a second liquid crystal layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
an illumination device;
a first liquid crystal device;
a second liquid crystal device; and
a liquid crystal display panel,
the first liquid crystal device including:
a first substrate including a first electrode thereon;
a second substrate including a second electrode thereon; and
a first cholesteric liquid crystal layer sandwiched between the first substrate and the second substrate,
the second liquid crystal device including:
a third substrate including a third electrode thereon;
a fourth substrate including a fourth electrode thereon; and
a second cholesteric liquid crystal layer sandwiched between the third substrate and the fourth substrate,
the liquid crystal display panel including:
a fifth substrate;
a sixth substrate;
a third liquid crystal layer sandwiched between the fifth substrate and the sixth substrate;
a first polarizer provided on a side opposite to a surface opposed to the third liquid crystal layer, of surfaces of the fifth substrate; and
a second polarizer provided on a side opposite to a surface opposed to the third liquid crystal layer, of surfaces of the sixth substrate, wherein
the first cholesteric liquid crystal layer reflects one of left-handed circularly polarized light and right-handed circularly polarized light, of light in a blue light wavelength range, in a planar state,
the second cholesteric liquid crystal layer reflects the other of the left-handed circularly polarized light and the right-handed circularly polarized light, of the light in the blue light wavelength range, in the planar state,
the first liquid crystal device and the second liquid crystal device are stacked successively, and the liquid crystal display panel is provided between a stacked layer body of the first liquid crystal device and the second liquid crystal device, and the illumination device.

2. The liquid crystal display device according to claim 1, wherein the first electrode, the second electrode, the third electrode, and the fourth electrode are a first strip electrode, a second strip electrode, a third strip electrode, and a fourth strip electrode, respectively.

3. The liquid crystal display device according to claim 1, wherein the first electrode, the second electrode, the third electrode, and the fourth electrode are a first individual electrode, a first common electrode, a second individual electrode, and a second common electrode, respectively, each of the first individual electrode and the second individual electrode has a rectangular shape, the first common electrode is provided on an entire surface which is in contact with the first cholesteric liquid crystal layer, of surfaces of the second substrate, and the second common electrode is provided on an entire surface which is in contact with the second cholesteric liquid crystal layer, of surfaces of the fourth substrate.

4. The liquid crystal display device according to claim 3, wherein the first individual electrode includes a plurality of first individual electrodes, the second individual electrode includes a plurality of second individual electrodes, and the liquid crystal display device further comprises a plurality of first switching elements connected to the plurality of first individual electrodes, respectively, and a plurality of second switching elements connected to the plurality of second individual electrodes, respectively.

* * * * *